(12) United States Patent
Kuroda

(10) Patent No.: US 8,922,794 B2
(45) Date of Patent: Dec. 30, 2014

(54) INFORMATION PROCESSING DEVICE THAT DISPLAYS A PREVIEW IMAGE, IMAGE FORMING APPARATUS THAT DISPLAYS A PREVIEW IMAGE, AND METHOD OF DISPLAYING A PREVIEW IMAGE

(75) Inventor: Kouji Kuroda, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 336 days.

(21) Appl. No.: 13/241,335

(22) Filed: Sep. 23, 2011

(65) Prior Publication Data

US 2012/0075654 A1    Mar. 29, 2012

(30) Foreign Application Priority Data

Sep. 29, 2010   (JP) ................................. 2010-218386

(51) Int. Cl.
*G06F 3/12*   (2006.01)
*H04N 1/00*   (2006.01)

(52) U.S. Cl.
CPC ......... *H04N 1/00474* (2013.01); *H04N 1/0044* (2013.01); *H04N 1/00482* (2013.01); *G06F 3/1207* (2013.01); *G06F 3/1208* (2013.01); *G06F 3/1256* (2013.01); *G06F 3/1285* (2013.01); *H04N 2201/0091* (2013.01); *H04N 2201/3288* (2013.01); *G06F 3/121* (2013.01)
USPC ........... 358/1.13; 358/2.1; 358/1.18; 358/1.9; 358/1.15; 358/1.16; 715/274; 715/275

(58) Field of Classification Search
None
See application file for complete search history.

(56) References Cited

U.S. PATENT DOCUMENTS

| 7,940,416 | B2 * | 5/2011 | Nakagiri et al. | 358/1.15 |
| 8,009,303 | B2 * | 8/2011 | Kujirai et al. | 358/1.13 |
| 8,526,060 | B2 * | 9/2013 | Fujita et al. | 358/2.1 |
| 2003/0210429 | A1 * | 11/2003 | Yamashita | 358/1.18 |
| 2004/0085560 | A1 | 5/2004 | Stringham | 358/1.13 |
| 2004/0177336 | A1 * | 9/2004 | Kujirai | 717/104 |
| 2005/0200870 | A1 * | 9/2005 | Nakagiri et al. | 358/1.9 |
| 2006/0287974 | A1 * | 12/2006 | Mochizuki et al. | 707/1 |
| 2007/0030510 | A1 | 2/2007 | Horiuchi | |
| 2010/0149590 | A1 * | 6/2010 | Nishiyama et al. | 358/1.15 |
| 2010/0306646 | A1 * | 12/2010 | Fukase | 715/274 |

FOREIGN PATENT DOCUMENTS

| JP | 9-247327 | 9/1997 |
| JP | 2003-177905 | 6/2003 |
| JP | 2004-194078 A | 7/2004 |
| JP | 2007-49250 A | 2/2007 |
| JP | 2007-166201 | 6/2007 |

* cited by examiner

*Primary Examiner* — Hilina K Demeter
(74) *Attorney, Agent, or Firm* — Smith, Gambrell & Russell, LLP

(57) ABSTRACT

Provided is an information processing device, including an input device for receiving a specification input for specifying a page for which an image forming apparatus is caused to execute a job, a display for displaying preview images of only a first page and a last page among continuous pages and displaying the preview images of all non-continuous pages that are separate from each other without forming a continuous range when specified pages are the non-continuous pages, and a communication portion for transmitting data for executing a job based on the specified page.

9 Claims, 10 Drawing Sheets

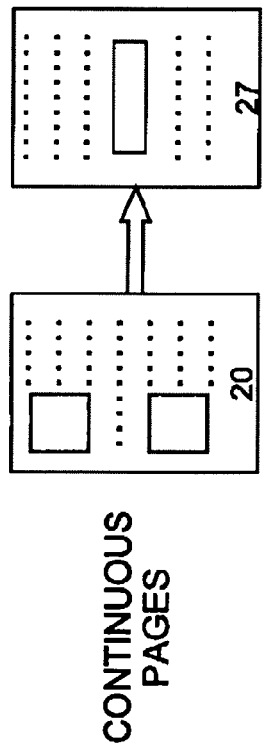
Fig.3A CONTINUOUS PAGES
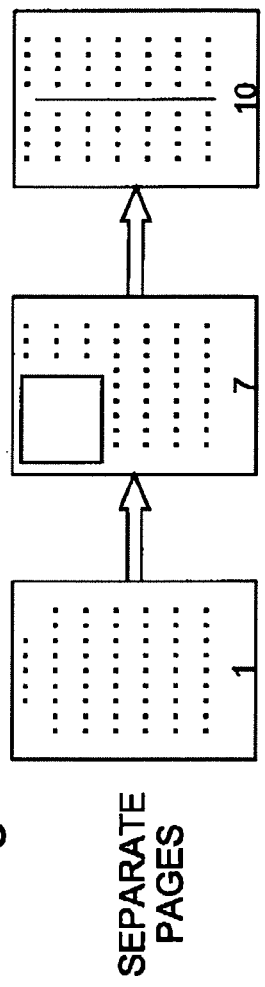
Fig.3B SEPARATE PAGES
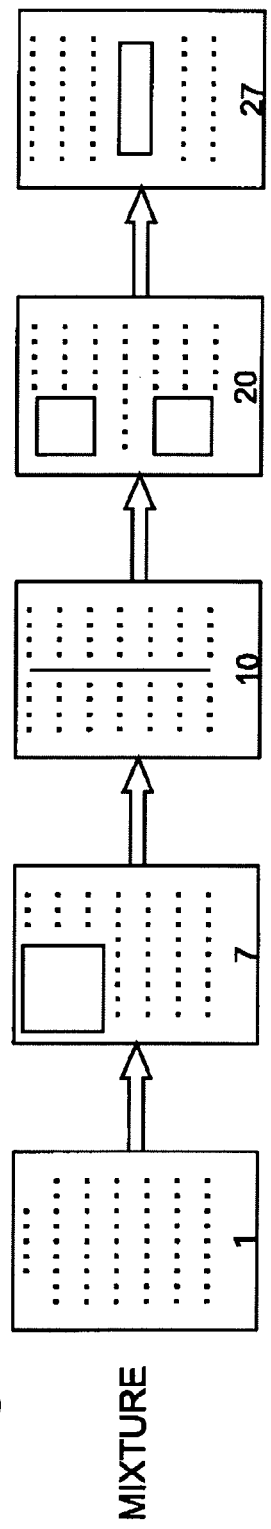
Fig.3C MIXTURE

INFORMATION PROCESSING DEVICE THAT DISPLAYS A PREVIEW IMAGE, IMAGE FORMING APPARATUS THAT DISPLAYS A PREVIEW IMAGE, AND METHOD OF DISPLAYING A PREVIEW IMAGE

This application is based upon and claims the benefit of priority from the corresponding Japanese Patent Application No. 2010-218386 filed on Sep. 29, 2010, the entire contents of which are incorporated herein by reference.

BACKGROUND OF THE INVENTION

1. Field of the Invention

The present invention relates to an information processing device and an image forming apparatus that display a preview image of a page for which a job is to be executed within one data item. The invention also relates to a method of displaying a preview image.

2. Description of Related Art

There are information processing devices and image forming apparatuses that display a preview image of a page to be printed or transmitted. The preview image is referenced to confirm whether or not a result desired by a user can be obtained (whether or not there is no error in settings). For example, by preview image display, it is possible to confirm whether or not a specified page is appropriate. Further, it is possible to confirm whether or not a large number of pages include a page that must not be transmitted.

As an example thereof, there is known an information processing device that performs preview display as described below. Specifically, there is known an information processing device that gives a transmission instruction to transmit transmission data to a specified destination, which includes display means for displaying preview information, display switching means for giving an instruction to switch display of the preview information, determination means for determining whether or not all items of the preview information have been displayed by the display means, and transmission instructing means for giving the transmission instruction to transmit the transmission data to the specified destination when it is determined that all the items of the preview information have been displayed. On this information processing device, the transmission instruction is not given unless all the items of transmission data have been output in advance, and the user is required to confirm (all) contents of the transmission data.

First, there is a case where the information processing device (for example, personal computer) transmits data to the image forming apparatus and causes the image forming apparatus to perform a printing job. Alternatively, there is a case where data accumulated on the image forming apparatus is reused for printing or transmission. At this time, the user may perform printing or the like by specifying some pages from among a plurality of pages. However, there is a case where the user erroneously specifies a page different from a desired page. In particular, in a case of selecting one or several pages from among tens of pages or hundreds of pages, the user is liable to make an error in specifying a page.

When the printing or transmission is performed on the erroneously specified page, the result desired by the user cannot be obtained. This causes waste of resources such as paper, toner, and power. Further, it is wasteful to take time to make settings again. This raises such a problem that the user should be allowed to confirm whether or not the specified page is a desired page by the preview image or the like.

It is true that failures in the printing or transmission may be reduced by, as in the case of the above-mentioned known information processing device, displaying the preview images of all pages after the user specifies the pages. However, the above-mentioned known information processing device allows the transmission only after all the preview pages have been viewed. Therefore, the transmission or printing of a large number of pages (for example, several tens to several hundreds of pages) of data requires an enormous amount of time only to confirm the preview pages. Further, forcing the user to view all the preview pages while confirmation of only a necessary part suffices may causes the confirmation to be inaccurate and to lack careful attention. Accordingly, the above-mentioned known information processing device is troublesome for the user, thereby presenting a problem of being impractical and inefficient.

SUMMARY OF THE INVENTION

The present invention has been made in view of the above-mentioned problem, and an object thereof is to: make it possible to easily and reliably confirm whether or not a specified page within data is a desired page, thereby preventing the occurrence of an error in specifying the page to eliminate waste; and shorten a time required to confirm preview images to a minimum, thereby enhancing productivity and usability.

In order to solve the above-mentioned problem, an information processing device according to a first aspect of the present invention includes: an input device for receiving a specification input for specifying a page for which an image forming apparatus is caused to execute a job among pages included in data, an instruction input for causing a preview image of a specified page being the page specified by the specification input to be displayed after the specification input for specifying the page is made, and an input for switching display pages for the preview image; a display for displaying the preview images of only a first page and a last page among continuous pages that form a continuous range when the specified pages are the continuous pages and displaying the preview images of all non-continuous pages that are separate from each other without forming the continuous range when the specified pages are the non-continuous pages; and a communication portion for transmitting data for executing a job to be executed by the image forming apparatus based on the specified page.

Further, an image forming apparatus according to a second aspect of the present invention includes: a storage portion for storing an accumulated document including image data on one or a plurality of pages; an image forming portion for performing printing based on the accumulated document; an input portion for receiving a specification input for specifying a page for which a job is to be executed among the one or the plurality of pages included in the accumulated document, an instruction input for causing a preview image of a specified page being the page specified by the specification input to be displayed after the specification input for specifying the page is made, and an input for switching display pages for the preview image; and a display portion for displaying the preview images of only a first page and a last page among continuous pages that form a continuous range when the specified pages are the continuous pages and displaying the preview images of all non-continuous pages that are separate from each other without forming the continuous range when the specified pages are the non-continuous pages.

According to the present invention, it is possible to easily and reliably confirm whether or not the specified page is the desired page. Further, an error in the executed job can be prevented, and hence it is possible to eliminate waste of toner, paper, time, energy, and the like. Further, the time required to confirm the preview images can be shortened, which can enhance the productivity and improve the usability.

Further features and advantages of the present invention will become apparent from the description of embodiments given below.

BRIEF DESCRIPTION OF THE DRAWINGS

FIGS. 3A to 3C are explanatory diagrams illustrating examples of how preview images are displayed on the computer. FIG. 3A illustrates a case where specified pages are continuous pages. FIG. 3B illustrates a case where the specified pages are non-continuous pages. FIG. 3C illustrates a case where the specified pages are a mixture of the non-continuous pages and the continuous pages.

DETAILED DESCRIPTION OF PREFERRED EMBODIMENTS

Hereinbelow, a first embodiment of the present invention is now described with reference to FIGS. 1 to 5. Here, the present invention is applicable to various information processing devices, but description is given by taking as an example a computer (corresponding to an information processing device). Note that, such elements as configuration and layout described in this embodiment are provided merely by way of example, and not by way of limiting the scope of the present invention.

(Hardware Configuration of the Computer)

Figure 1:
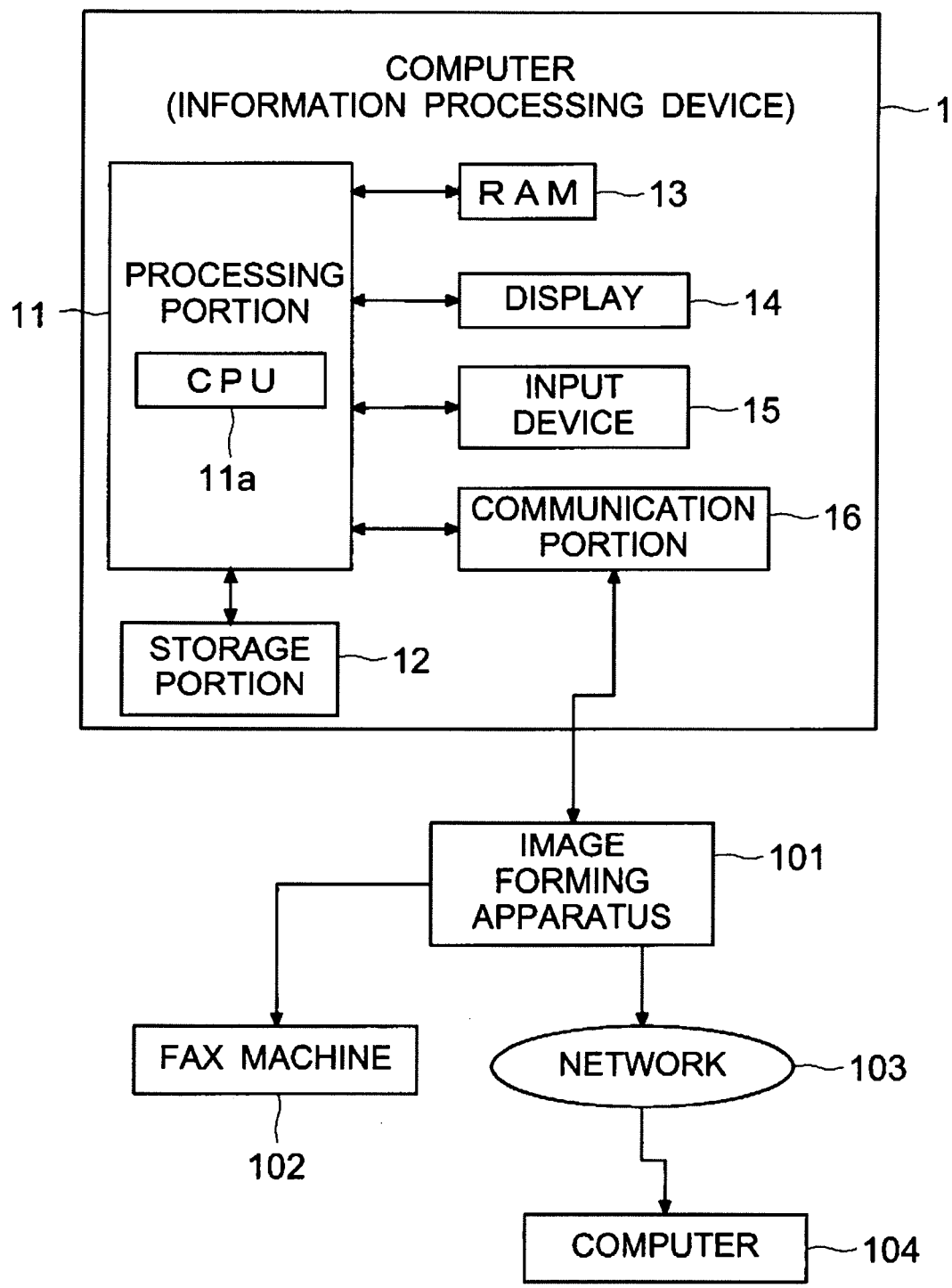
FIG. 1 is a block diagram illustrating an example of a hardware configuration of a computer.

First, reference is made to FIG. 1 to describe an example of a computer 1 according to the first embodiment. FIG. 1 is a block diagram illustrating an example of a hardware configuration of the computer 1.

First, the computer 1 illustrated in FIG. 1 is, for example, a personal computer. As illustrated in FIG. 1, the computer 1 includes a processing portion 11. The processing portion 11 performs arithmetic processings, processings for image data (for example, preview image generation processing), data processings such as compression and decompression, and operation control of each component of the computer 1. The processing portion 11 is formed as, for example, a board and includes an element for arithmetic operations and processings such as a CPU 11a.

The computer 1 includes a storage portion 12 for storing data in a non-volatile manner. The storage portion 12 has a larger capacity than a RAM 13. The storage portion 12 is, for example, a hard disk drive (HDD). Note that, the storage portion 12 may be an SSD using a flash ROM. The storage portion 12 stores programs (for example, OS and various applications) for causing the computer 1 to operate and to perform various processings and data therefor.

Further, the computer 1 includes the RAM 13 as a main memory (main storage device) for storing data and programs in a volatile manner. The RAM 13 accumulates the programs and data, which are read from the storage portion 12, for causing the computer 1 to operate and to perform the various processings. The CPU 11a uses the programs and data within the RAM 13 to perform arithmetic operations and processings.

Further, the computer 1 includes a display 14. For example, the display 14 displays a screen and an image when a program (application software) is caused to run. For example, when the program is activated, the processing portion 11 causes the display 14 to display screens and images for operating the program and making inputs. Further, for example, according to the program for an image forming apparatus stored in the storage portion 12, the processing portion 11 causes the display 14 to display a screen for making settings for printing or transmission.

Further, the computer 1 includes an input device 15. The input device 15 is, for example, a keyboard and a pointing device (mouse). By using the input device 15 with reference to the display on the display 14, it is possible to make an input and a setting regarding the program or the like. The program is caused to run based on the input, and causes the processing portion 11 to perform a processing.

Further, the computer 1 includes a communication portion 16 as an interface for communications with an external portion. The communication portion 16 includes a chip, a circuit, a connector, and a socket for communications. Through the communication portion 16, the computer 1 is communicatively connected to an image forming apparatus 101 (for example, printer, FAX machine, or multifunction peripheral) that functions as a printer or a transmitter for the computer 1. As to the connection manner, the computer 1 may be connected by cable directly to the communication portion 16 or may be connected thereto via a network.

By using the input device 15 to operate the computer 1, a user can transmit data for executing a job, which serves to cause the image forming apparatus 101 to perform a job (printing job or transmission job), from the computer 1 to the image forming apparatus 101. The data for executing a job includes image data and setting data used to execute a job.

The image forming apparatus 101 can perform printing based on the data for executing a job received from the computer 1 (printer function). Further, based on the data for executing a job received from the computer 1, the image forming apparatus 101 can transmit the image data or the like to a FAX machine 102 or another computer 104 via a network 103 (FAX function or Internet FAX function).

(Setting Screen for the Data for Executing a Job)

Figure 2:
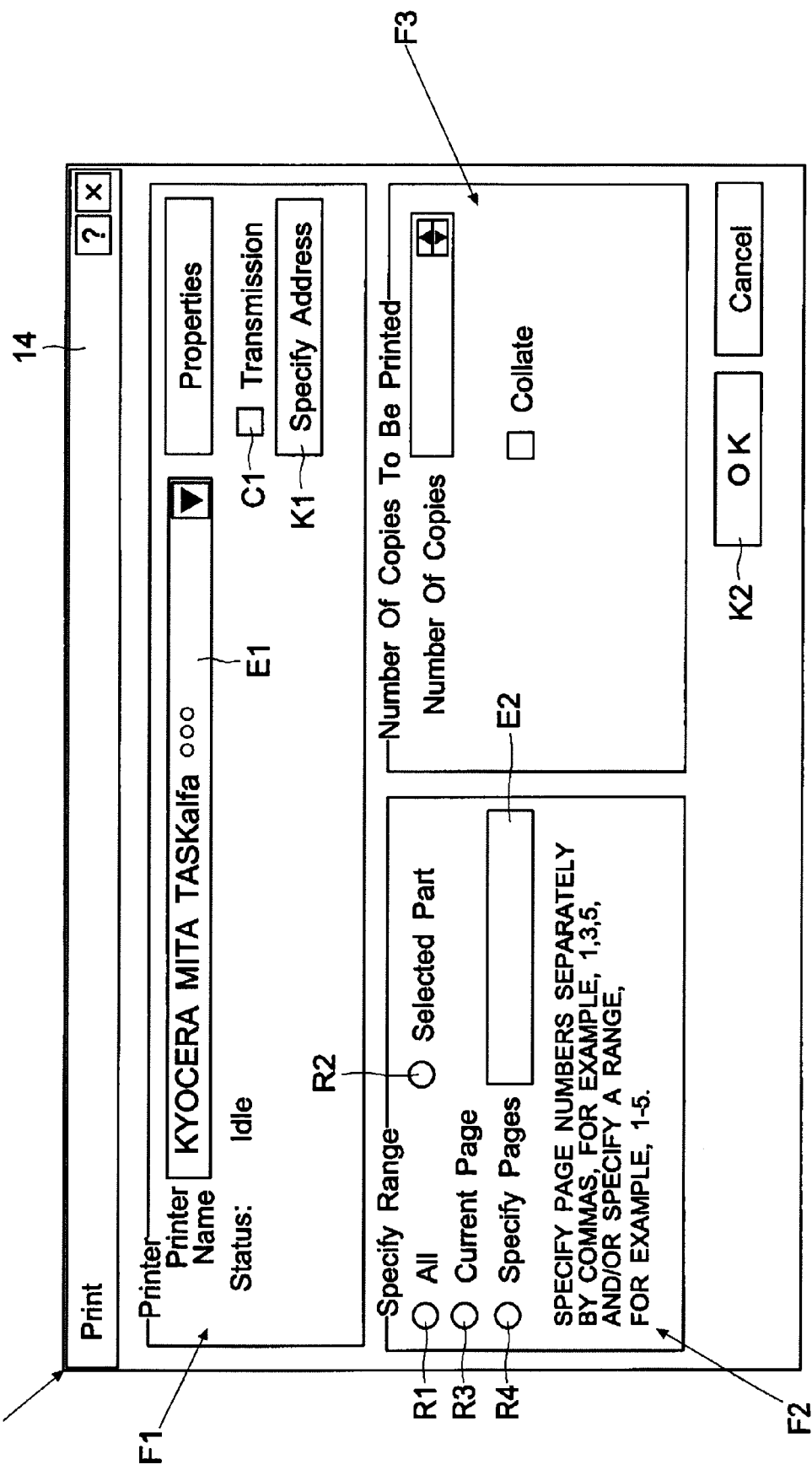
FIG. 2 is an explanatory diagram illustrating an example of a setting screen for data for executing a job which is displayed on the computer.

Next, reference is made to FIG. 2 to describe an example of a setting screen for the data for executing a job which is to be transmitted from the computer 1 to the image forming apparatus 101 according to the first embodiment. FIG. 2 is an explanatory diagram illustrating an example of a setting screen S10 for the data for executing a job which is displayed on the computer 1.

For example, the user causes programs (such as a document creation program, a table calculation program, and an image data processing program) stored (installed) in the storage portion 12 of the computer 1 to run and causes the computer 1 to perform various processings. After each of those programs is activated, when a printing command or a transmission command is executed while a file corresponding to the program caused to run is opened, a program related to the transmission of the data for executing a job to the image forming apparatus 101 is activated. Then, the processing portion 11 causes the display 14 to display the setting screen S10 for the data for executing a job which is illustrated in FIG. 2.

The setting screen S10 for the data for executing a job is, for example, divided into a plurality of areas. For example, a top area of the setting screen S10 for the data for executing a job is a basic area F1 for performing confirmation of information on the printer and other such operations. The bottom left of the basic area F1 is a page specification area F2 for specifying a page to be printed or transmitted within a file of the program for which the printing command or the transmission command has been executed. Further, the bottom right of the basic area F1 is a printed copy number setting area F3 for setting the number of copies to be printed.

The basic area F1 is provided with a transmission target display field E1 that indicates the image forming apparatus 101 to which the data for executing a job is to be transmitted. Note that, the computer 1 may be connected to a plurality of image forming apparatuses 101 via the network 103 or the like. Therefore, when the input device 15 is used to press a button on the right edge of the transmission target display field E1, the image forming apparatus 101 that is communicatively connected to be a transmission target of the data for executing a job can be selected in a pulldown menu format.

Further, a transmission checkbox C1 is pressed in order to cause the data for executing a job to be transmitted from the image forming apparatus 101 instead of being printed. When the transmission checkbox C1 is checked, the processing portion 11 causes the image forming apparatus 101 to perform transmission to the FAX machine 102, the computer 104, or the like based on the data for executing a job.

Note that, an address specification key K1 is provided below the transmission checkbox C1. When the address specification key K1 is pressed, for example, the processing portion 11 causes the display 14 to display a screen (not shown) for inputting address information (such as a FAX number, a network address, or an e-mail address) of a communication partner at a transmission destination. Then, the user uses the input device 15 to input the address information. The input address information is transmitted from the computer 1 to the image forming apparatus 101.

The page specification area F2 is provided with four radio buttons R for specifying a page to be printed or transmitted within a file for which the printing or transmission command has been executed. A radio button R1 labeled "All" is pressed to perform the printing or transmission of all the pages included in the file. A radio button R2 labeled "Selected part" is pressed to perform the printing or transmission of a part that is previously selected by a drag operation or the like on the program. A radio button R3 labeled "Current page" is pressed to perform the printing or transmission of only the page on which the user is currently performing an operation or an input within the file. A radio button R4 labeled "Specify pages" is pressed to specify pages to be printed or transmitted by using the input device 15.

The user presses the radio button R4 to perform an input for specifying the pages to be printed or transmitted into a page specification field E2 provided on the right of the radio button R4 by using the keyboard or the like. When the printing or transmission is performed on one separate page that does not form a sequence of pages (non-continuous page), the number of the specific page is input into the page specification field E2. For example, in the case of printing or transmitting only the first page of the file, the user inputs "1" into the page specification field E2.

Further, in a case of printing or transmitting a plurality of non-continuous pages, the numbers of the desired pages are input into the page specification field E2 in order by using the keyboard or the like. For example, to print or transmit pages 1 and 7, the user inputs the page numbers separately by commas such as "1,7" into the page specification field E2.

Further, to print or transmit a continuous range (continuous pages) of, for example, pages 20 to 27 of the file containing fifty pages in total, the user uses the keyboard or the like to input "20-27" into the page specification field E2 by coupling the first page number and the last page number of the range by hyphen. Note that, the page specification field E2 allows an input such as "1,7,20-27" in both manners of the non-continuous pages and the continuous pages.

After the user finishes the setting and confirmation related to the transmission of the data for executing a job, the user presses an OK key K2. When the OK key K2 is pressed, the processing portion 11 causes the display 14 to display preview images of the pages (specified pages) that have been specified so as to be printed or transmitted on the setting screen S10 for the data for executing a job. After all the preview images to be displayed have been confirmed by the user, the processing portion 11 causes the data for executing a job to be transmitted from the communication portion 16 to the image forming apparatus 101 according to the contents set and input through the setting screen S10 for the data for executing a job.

(Preview Image)

Next, reference is made to FIGS. 3A to 3C to describe examples of how the preview images are displayed on the computer 1 according to the first embodiment. FIGS. 3A to 3C are explanatory diagrams illustrating the examples of how the preview images are displayed on the computer 1. FIG. 3A illustrates a case where the specified pages are continuous pages. FIG. 3B illustrates a case where the specified pages are non-continuous pages. FIG. 3C illustrates a case where the specified pages are a mixture of the non-continuous pages and the continuous pages.

In general, immediately after a setting completion for printing or the like is input (for example, after an OK key on the settings screen for printing or the like is pressed), a computer generates the data for executing a job and transmits the data to the image forming apparatus. In order to confirm the contents of the pages and the presence/absence of an error before the printing or transmission, the user confirms the preview images before the setting completion for printing or the like is input. For example, in a case where the program includes a preview function, the user executes a preview command. With this operation, for example, the preview images corresponding to all the pages are displayed, and the user repeatedly switches the preview image displayed on a display to the next page, and confirms the contents and the like by the preview image of the desired page.

However, on the computer 1 of this embodiment, when the OK key K2 is pressed on the setting screen S10 for the data for executing a job (after the pages are specified), the display 14 displays the preview images of the pages (specified pages) that have been specified so as to be printed or transmitted.

Here, reference is made to FIGS. 3A to 3C to describe display examples of the preview images. Note that, FIGS. 3A to 3C each illustrate a page number at the bottom of each page as an example. Further, FIGS. 3A to 3C illustrate an example in which the display 14 displays the preview images of respective pages in order one by one (the display order is indicated by the outline arrows). For example, the pages of the displayed preview images are switched over by an operation of the input device 15 such as a mouse click or depression of an arrow key of the keyboard. Note that, the preview images corresponding to a plurality of pages may be displayed on a single screen of the display 14.

First, reference is made to FIG. 3A to describe the case where the specified pages are the continuous pages that form a sequence of pages. The following description is directed to an example in which the continuous pages of pages 20 to 27 among the pages included in the file are specified as the pages to be printed or transmitted. In other words, an example in which the radio button R4 is pressed with "20-27" input into the page specification field E2 is described.

Unlike document reading, in the printing or transmission of the opened file, there is no fear that a different document may get mixed between pages. It suffices that the user can confirm the first page and the last page among the specified pages and can confirm whether or not there is no error in specifying the range. Therefore, when the continuous pages are specified as the pages to be printed or transmitted, the processing portion 11 causes the display 14 to display the preview images of only the first page and the last page among the continuous pages. FIG. 3A illustrates an example in which the preview images of only the twentieth page and twenty-seventh page within the range from page 20 to page 27 are displayed. This shortens the time required to confirm the preview images compared to a case of causing the preview images of all the pages within the range to be confirmed.

Note that, the specification of all the pages of the opened file (with the radio button R1 pressed) corresponds to the specification of the continuous pages (continuous range). Therefore, when a file contains, for example, fifty pages, the processing portion 11 may cause the display 14 to display the preview images of the first page and the fiftieth page (last page). Note that, it is often possible that the range to be printed or transmitted is apparent with few needs to confirm the preview images, and the preview images may be inhibited from being displayed when all the pages are to be printed or transmitted.

Next, reference is made to FIG. 3B to describe the case where the specified pages are the non-continuous pages (case where the specified pages are separate from each other without forming a sequence of pages). The following description is directed to an example in which three specific pages of page 1, page 7, and page 10 among the pages included in the file are specified as the pages to be printed or transmitted. In other words, an example in which the radio button R4 is pressed with, for example, "1,7,10" input into the page specification field E2.

In a case where only some specific pages are intended to be printed or transmitted, erroneous page specification can occur. When the printing or transmission is performed with a shift in the page specification, the printing or transmission needs to be performed again, which causes waste. When pages that do not form a sequence of pages are specified as the range to be printed or transmitted, the processing portion 11 causes the display 14 to display the preview images of all the non-continuous pages. FIG. 3B illustrates an example in which the preview images of all the non-continuous pages of the first page, the seventh page, and the tenth page are displayed. With this configuration, it is possible to confirm whether or not there is no error (shift) in specifying the pages.

Note that, such specification as to print or transmit the current page (with the radio button R3 pressed) also corresponds to the specification of the non-continuous page. Therefore, the processing portion 11 may cause the display 14 to display the preview image of the current page. Note that, in this case, the user is supposed to know the contents of the range to be printed or transmitted, and hence the processing portion 11 may inhibit the preview image from being displayed when the radio button R3 is pressed.

Further described is such specification as to print or transmit a selected part (with the radio button R2 pressed). The specification of the selected part that covers a plurality of pages may be handled as the specification of the continuous pages in the same manner as in the example illustrated in FIG. 3A. The specification of the selected part that falls within one page may be handled as the specification of the non-continuous page in the same manner as in the example illustrated in FIG. 3B.

Next, reference is made to FIG. 3C to describe the case of specifying a mixture of the non-continuous pages and the continuous pages. The following description is directed to an example in which the mixture of the three non-continuous pages of page 1, page 7, and page 10 and the continuous pages of pages 20 to 27 among the pages included in the opened file is specified as the pages to be printed or transmitted. In other words, an example in which the radio button R4 is pressed with "1,7,10,20-27" input into the page specification field E2 is described.

When both the non-continuous pages and the continuous pages are specified as the pages to be printed or transmitted, the processing portion 11 causes the display 14 to display the preview images of all the pages of the specified non-continuous pages and the preview images of the first page and the last page of the specified continuous pages. FIG. 3C illustrates an example in which the preview images of the first page, the seventh page, the tenth page, the twentieth page, and the twenty-seventh page (five pages in total) are displayed. It can be said that the example of FIG. 3C is assumed by multiplying the examples of FIG. 3A and FIG. 3B.

(Confirmation of Job Execution after the Preview Images are Viewed)

Figure 4:
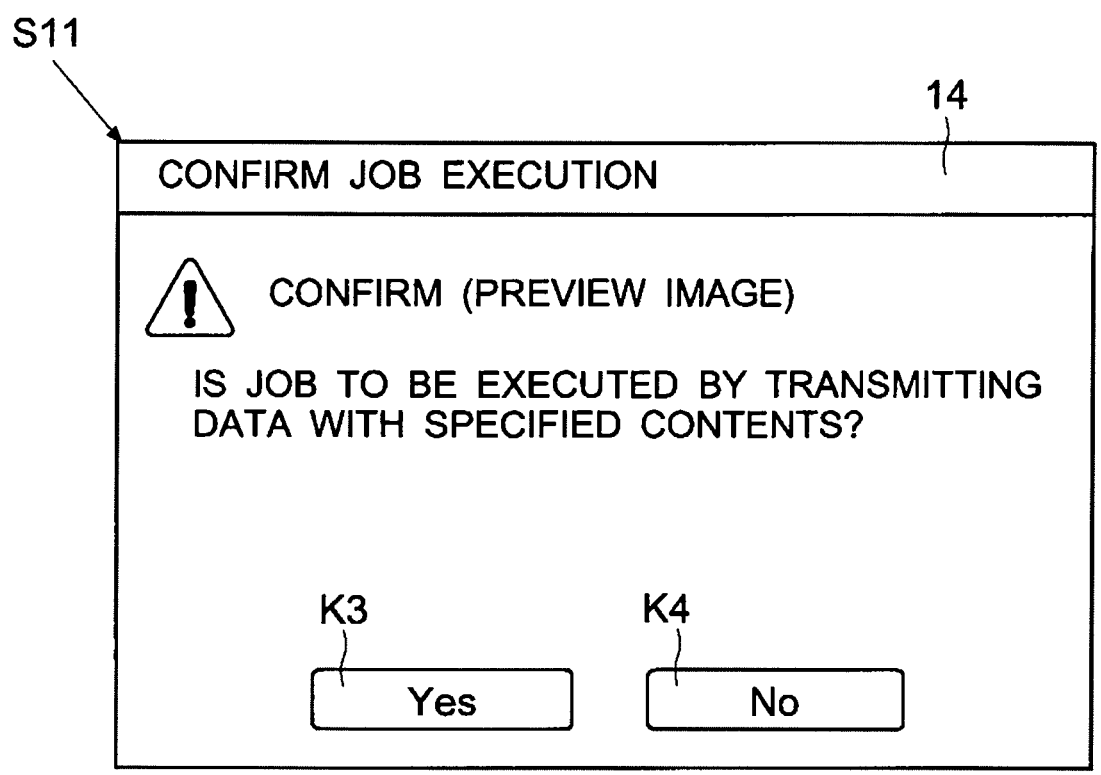
FIG. 4 is an explanatory diagram illustrating an example of a job execution confirmation screen which is displayed on the computer.

Next, reference is made to FIG. 4 to describe an example of confirmation of job execution according to the first embodiment. FIG. 4 is an explanatory diagram illustrating an example of a job execution confirmation screen S11 which is displayed on the computer 1.

The computer 1 of this embodiment is configured to enable reliable confirmation of the presence/absence of an error in the page specification and to reduce the number of preview images to be displayed and confirmed to a minimum. This allows the user to efficiently confirm the preview images and grasp a setting error (page specification error) and the like. However, it is desired to cancel a job when there is a setting error in order to prevent wasteful job execution.

To this end, on the computer 1 of this embodiment, when the displaying is finished for all the preview images to be displayed, the processing portion 11 causes the display 14 to display the job execution confirmation screen S11 illustrated in FIG. 4. A Yes key K3 is pressed when there is no error found in the page specification after the preview images are confirmed and the printing or transmission may be executed as it is (when the data for executing a job may be transmitted). A No key K4 is pressed when there is an error in the page specification after the preview images are confirmed and the printing or transmission should be canceled so as to have the setting performed again. The input device 15 is used to press the Yes key K3 or the No key K4.

(Preview Image Display Control)

Figure 5:
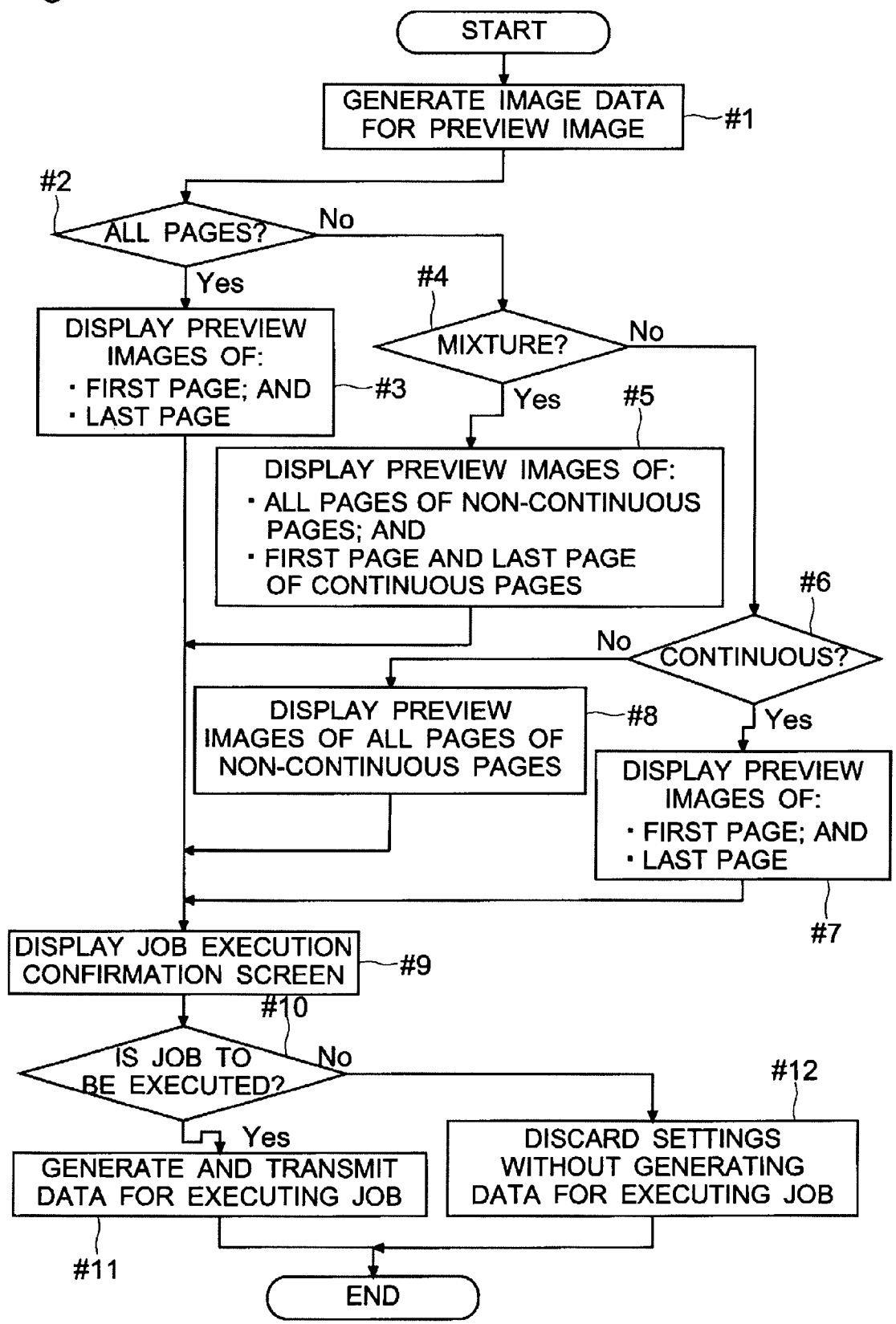
FIG. 5 is a flowchart illustrating an example of display control of the preview image performed on the computer.

Next, reference is made to FIG. 5 to describe an example of display control of the preview image performed on the computer 1 according to the first embodiment. FIG. 5 is a flowchart illustrating an example of the display control of the preview image performed on the computer 1.

First, the start illustrated in FIG. 5 represents a time point when the OK key K2 is pressed on the setting screen S10 for the data for executing a job, which is displayed by executing a command on the program, so as to transmit the data for executing a job to the image forming apparatus 101.

Subsequently, the processing portion 11 generates image data for a preview image to be displayed regarding a page that has been specified so as to be printed or transmitted based on an opened file (Step #1). For the continuous pages, the processing portion 11 generates the image data for the preview images of the first and last pages. Further, the processing portion 11 generates the image data for the preview images of all the pages specified as the non-continuous pages.

If all the pages of the file are set to be printed or transmitted (with the radio button R1 selected; Yes in Step #2), the processing portion 11 causes the display 14 to display the preview images of the first page and the last page within the opened file (Step #3). On the other hand, if all the pages are not specified (No in Step #2), and if a mixture of the non-continuous pages and the continuous pages is specified (if the pages input into the page specification field E2 are a mixture of the non-continuous pages and the continuous pages; Yes in Step #4), the processing portion 11 causes the display 14 to display the preview images of all the non-continuous pages and the first and last pages of the continuous pages (Step #5).

On the other hand, if there is no mixture (No in Step #4), and if the specified pages are the continuous pages (Yes in Step #6), the processing portion 11 causes the display 14 to display the preview images of the first and last pages of the continuous pages (Step #7). On the other hand, if the specified pages are the non-continuous pages (No in Step #6), the processing portion 11 causes the display 14 to display the preview images of all the non-continuous pages (Step #8).

Then, after all the preview images to be displayed have been displayed (after Step #3, Step #5, Step #7, and Step #8), the processing portion 11 causes the display 14 to display the job execution confirmation screen S11 (Step #9).

After that, the processing portion 11 confirms whether or not to execute the job for the specified page (confirms which of the Yes key K3 and the No key K4 has been pressed) (Step #10). If the Yes key K3 is pressed to execute the job for the specified page as it is, the processing portion 11 generates the data for executing a job for the specified page, and transmits the data to the image forming apparatus 101 via the communication portion 16 (Step #11). With this operation, the data for executing a job is transmitted to the image forming apparatus 101, and the job such as the printing or transmission is executed on the image forming apparatus 101 (end).

On the other hand, if the No key K4 is pressed to cancel the job execution for the specified page, the processing portion 11 discards the settings made on the setting screen S10 for the data for executing a job without generating the data for executing a job (Step #12), which ends the control as it is (end). At this time, for example, the display 14 displays the screen of the file of the opened program.

As described above, the information processing device (computer 1) according to this embodiment includes: the input device 15 for receiving a specification input for specifying a page for which the image forming apparatus is caused to execute a job among pages included in data (specification input of a page made on the setting screen S10 for the data for executing a job), an instruction input for causing the preview image of a specified page being the page specified by the specification input to be displayed after the specification input for specifying a page is made (for example, input by pressing the OK key K2 on the setting screen S10 for the data for executing a job), and an input for switching display pages for the preview image (operation input of the input device 15 for switching the display pages for the preview image, for example, a mouse click or depression of the arrow key of the keyboard); the display 14 for displaying the preview images of only the first and last pages among continuous pages that form a continuous range when the specified pages are the continuous pages and displaying the preview images of all non-continuous pages that are separate from each other without forming a continuous range when the specified pages are the non-continuous pages; and the communication portion 16 for transmitting the data for executing a job to be executed by the image forming apparatus based on the specified page.

With this configuration, when the pages are continuous, it practically serves the purpose to confirm the preview images of only necessary and sufficient pages. Accordingly, the number of pages of the preview images to be confirmed becomes minimum, and hence even when the range of the continuous pages is wide (even when the number of specified pages is large), it is possible to reduce the time required to confirm the preview images compared to the conventional technology. Further, it is possible to reliably confirm whether or not one page among a large number of pages or specific pages existing in the large number of pages in a dispersed manner have been specified without an error. This can prevent the occurrence of waste of paper and the like due to a setting error (page specification error). Further, it is possible to efficiently confirm whether or not there is no error in the page specification, and hence the user can concentrate on confirming the specified pages compared to a case where the preview images of all the specified pages must be confirmed. Accordingly, it is possible to discover an error in specifying the page with accuracy.

Further, the input device 15 receives an input for specifying the pages of both kinds of the continuous pages and the non-continuous pages, and the display 14 displays, for the continuous pages, the preview images of only the first and last pages among the continuous pages, and for the non-continuous pages, displays the preview images of all the non-continuous pages. With this configuration, the user can specify the pages in a plurality of manners, and the preview images are displayed in accordance with the specified manner. Accordingly, the user can confirm the preview images with minimum labor and with accuracy according to the part of the specified pages, which allows the efficient confirmation of the preview images.

The input device 15 receives an input for specifying all the pages included in the data, and the display 14 displays the preview images of the first page and the last page within the data. With this configuration, even when all the pages within the data are specified, it serves the purpose to confirm the preview images corresponding to the two pages without confirming the preview images of all the pages. Accordingly, the user can confirm the preview images with minimum labor and with accuracy, which allows the efficient confirmation of the preview images.

Further, the communication portion 16 transmits the data for executing a job after the display 14 has displayed the preview images of all the pages to be displayed. With this configuration, the job of printing or transmission is executed after the user positively confirms whether or not there is no error in specifying the page, which causes no waste due to an error in specifying the page.

Second Embodiment

Next, reference is made to FIGS. 6 to 12 to describe a multifunction peripheral 2 according to a second embodiment of the present invention.

In the first embodiment, preview image display performed on the information processing device (computer 1) has been described. Described next in the second embodiment is preview image display performed on the image forming apparatus in place of the information processing device. In the description of the second embodiment, the image forming apparatus is exemplified by the multifunction peripheral 2. Note that, the multifunction peripheral 2 described in this embodiment can be used as the image forming apparatus that is communicatively connected to the computer 1 in the first embodiment.

(Outline of the Multifunction Peripheral 2)

Figure 6:
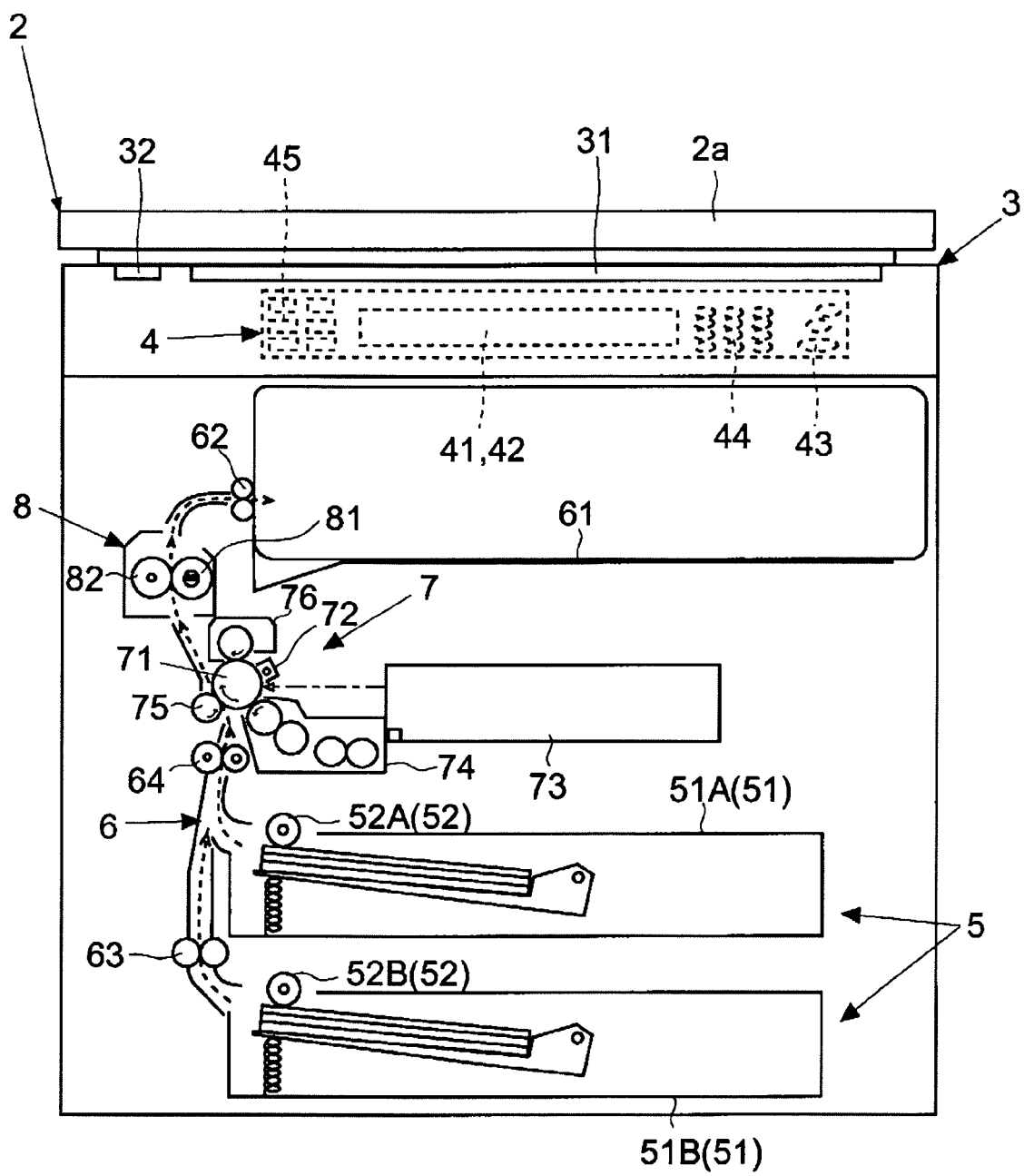
FIG. 6 is a sectional front view schematically illustrating an example of a multifunction peripheral.

First, reference is made to FIG. 6 to describe the multifunction peripheral 2 according to the second embodiment. FIG. 6 is a sectional front view schematically illustrating an example of the multifunction peripheral 2.

As illustrated in FIG. 6, the multifunction peripheral 2 of this embodiment includes a document cover 2a in its top portion, and a main body of the multifunction peripheral 2 is provided with an image reading portion 3, an operation panel 4, a sheet feeding portion 5, a conveyance path 6, an image forming portion 7, a fixing portion 8, and the like.

First, as indicated by the broken lines in FIG. 6, the operation panel 4 is provided in the upper front of the multifunction peripheral 2. Then, the operation panel 4 includes a liquid crystal display portion 41 (corresponding to a display portion) for displaying a state of the multifunction peripheral 2 and various messages. The liquid crystal display portion 41 can display one or a plurality of keys for performing selection of a function, setting, character input, and the like. Further, the liquid crystal display portion 41 is provided with a touch panel portion 42 (for example, resistive type; corresponding to an input portion). The touch panel portion 42 is used for detecting the position and coordinates of a part pressed on the liquid crystal display portion 41.

Further, the operation panel 4 is also provided with a start key 43 for giving an instruction to start executing various functions such as copying and a numeric keypad portion 44 (including a plurality of keys each assigned to one of numerals of 0 to 9 and symbols of * and #) for inputting numerals and the like. Further, the operation panel 4 is provided with a document box key 45 that is pressed to handle an accumulated document accumulated on the multifunction peripheral 2. The user can print or transmit the accumulated document stored on the multifunction peripheral 2 by pressing the document box key 45 to open a box and using the operation panel 4 to perform various operations. In this manner, the operation panel 4 is also provided with various hardware keys (corresponding to the input portion) such as the start key 43, the numeric keypad portion 44, and the document box key 45.

The document cover 2a has a fulcrum in a depth direction with respect to the paper surface of FIG. 6, and can be opened and closed in a vertical direction. In reading a document, the document cover 2a holds down the document placed on a contact glass 31 for placement reading. The image reading portion 3 reads a document and forms image data on the document. Further provided within the image reading portion 3 are optical system members (not shown) such as an exposure lamp, a mirror, a lens, and an image sensor (for example, CCD). Note that, a document conveying device for automatically and continuously feeding documents sheet by sheet to a reading position (contact glass 32 for feed reading) of the image reading portion 3 may be provided in place of the document cover 2a.

Those optical system members are used to apply light to a document placed on the contact glass 31 for placement reading. Then, the image reading portion 3 A/D-converts an output value of each pixel of the image sensor that has received light reflected from the document to thereby generate the image data. The multifunction peripheral 2 can perform printing based on the image data obtained by the reading (copy function).

The sheet feeding portion 5 receives a plurality of sheets of paper (for example, copy paper, plain paper, recycled paper, cardboard, and OHP sheet), and feeds paper to the conveyance path 6 sheet by sheet. The sheet feeding portion 5 includes cassettes 51 in each of which sheets of received paper are placed (in FIG. 6, the upper one is denoted by reference symbol 51A and the lower one is denoted by reference symbol 51B). Further provided are sheet feeding rollers 52 that are rotationally driven to feed paper from the cassette 51 to the conveyance path 6 (in FIG. 6, the upper one is denoted by reference symbol 52A and the lower one is denoted by reference symbol 52B). For example, in the printing, the sheet feeding roller 52 is rotationally driven to feed the paper to the conveyance path 6 sheet by sheet.

The conveyance path 6 is a path along which a sheet is conveyed from the sheet feeding portion 5 to a delivery tray 61. Note that, the image forming portion 7, the fixing portion 8, and the like are arranged along a paper conveyance path. Provided to the conveyance path 6 are a guide for guiding sheets, conveyance roller pairs 62 and 63 that are rotationally driven when a sheet is conveyed, a registration roller pair 64 for holding a conveyed sheet in front of the image forming portion 7 and feeding the sheet in synchronization with a timing at which a toner image is formed, and the like.

The image forming portion 7 forms a toner image based on the image data and transfers the toner image onto the conveyed sheet. For that purpose, the image forming portion 7 includes a photosensitive drum 71 supported so as to be rotationally driven in the arrow direction indicated in FIG. 6 and a charging device 72, an exposure device 73, a developing device 74, a transfer roller 75, a cleaning device 76, and the like that are arranged around the photosensitive drum 71.

Described below are processes for toner image formation and transfer. The photosensitive drum 71 is provided substantially at the center of the image forming portion 7 and is rotationally driven in a predetermined direction. The charging device 72 charges the photosensitive drum 71 to a predetermined potential. Based on the image data, the exposure device 73 outputs a laser beam, scans and exposes a front surface of the photosensitive drum 71, and forms an electrostatic latent image according to the image data. Note that, the image data obtained by the image reading portion 3 and the image data transmitted from a PC 201 in the external portion and a communication partner's FAX machine 202 that are connected via a network or the like (see FIG. 7) are used.

Then, in FIG. 6, the developing device 74 develops the electrostatic latent image formed on the photosensitive drum 71 by supplying toner thereto. The transfer roller 75 is in pressure contact with the photosensitive drum 71 to form a nip. The sheet enters the nip in synchronization with the timing at which the toner image is formed. When the sheet enters, a predetermined voltage is applied to the transfer roller 75, and the toner image on the photosensitive drum 71 is transferred onto the sheet. The cleaning device 76 removes toner remaining on the photosensitive drum 71 after the transfer.

The fixing portion 8 fixes the toner image that has been transferred onto the sheet. The fixing portion 8 according to this embodiment is constituted mainly by a heating roller 81 embedded with a heating element and a pressure roller 82. The heating roller 81 and the pressure roller 82 are in pressure contact with each other to form a nip therebetween. When the sheet passes through the nip, the toner on the front surface of the sheet is fused/heated. As a result, the toner image is fixed to the sheet. The sheet to which the toner has been fixed is delivered to the delivery tray 61.

(Hardware Configuration of the Multifunction Peripheral 2)

Figure 7:
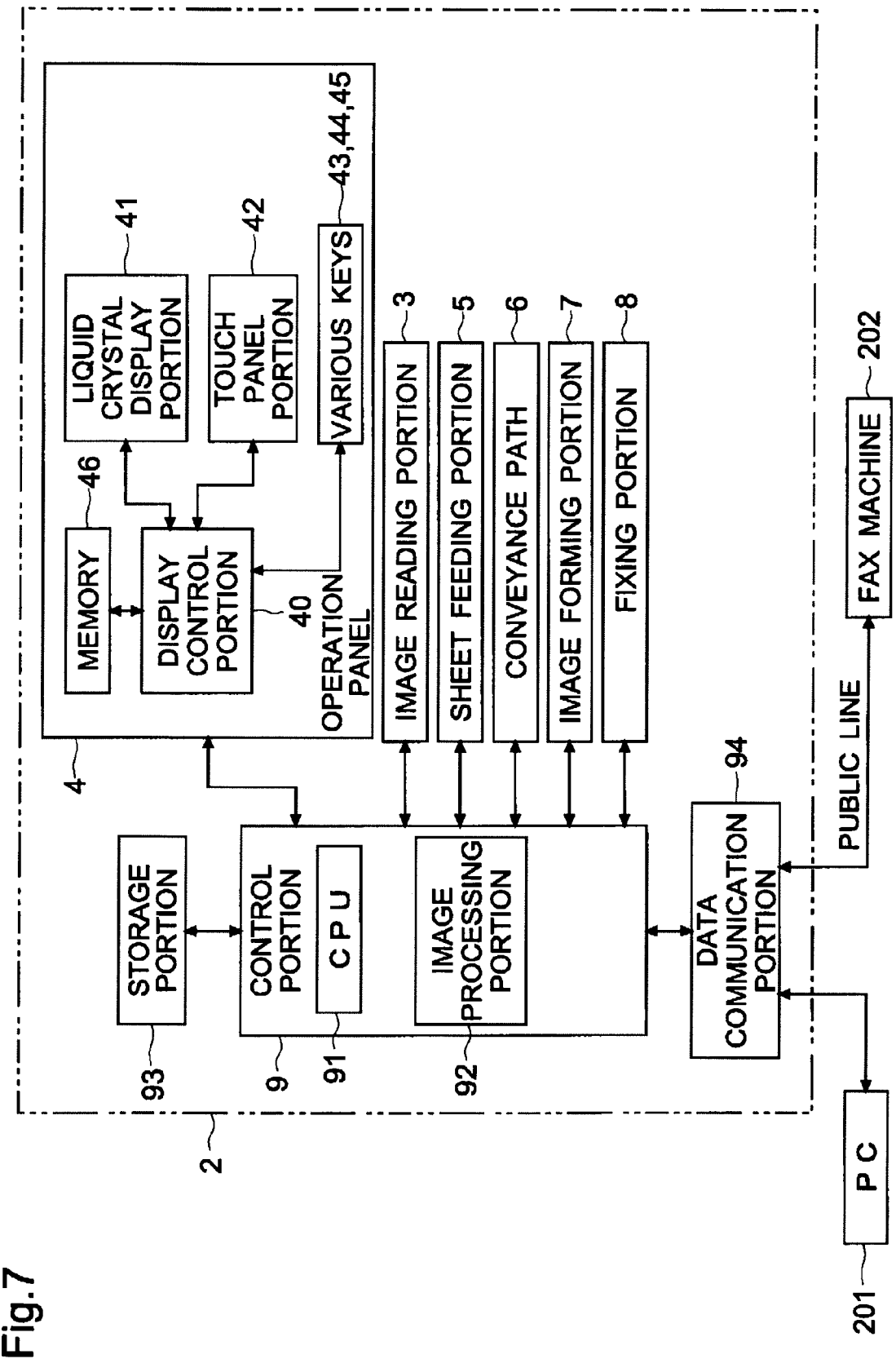
FIG. 7 is a block diagram illustrating an example of a configuration of the multifunction peripheral.

Next, reference is made to FIG. 7 to describe an example of a hardware configuration of the multifunction peripheral 2 according to the second embodiment. FIG. 7 is a block diagram illustrating an example of a configuration of the multifunction peripheral 2.

A control portion 9 is provided inside the multifunction peripheral 2. The control portion 9 controls an operation of the multifunction peripheral 2, and includes, for example, a CPU 91 and an image processing portion 92. Note that, the control portion 9 may be provided separately by function with a plurality of kinds of portions such as a primary control portion for performing overall control and image processing, and an engine control portion for controlling image formation and ON/OFF or the like of motors or the like that cause various rotational bodies to rotate. The CPU 91 is a central processing unit, and controls each component of the multifunction peripheral 2 based on a program and data that are stored in a storage portion 93 and developed. The image processing portion 92 performs various image processings on the image data to be printed and the image data to be transmitted to the PC 201 in the external portion or the communication partner's FAX machine 202.

The storage portion 93 includes, for example, a ROM, a RAM, and a HDD, and is configured by combining non-volatile and volatile storage devices. Further, the storage portion 93 stores various pieces of data, including various control programs, various pieces of control data, and setting data of the multifunction peripheral 2, and image data. For example, the image data on the document read by the image reading portion 3 can be stored on the HDD of the storage portion 93.

Then, the control portion 9 is connected to respective components such as the operation panel 4, the image reading portion 3, the sheet feeding portion 5, the conveyance path 6, the image forming portion 7, and the fixing portion 8 through a bus, a signal line, or the like, and controls the respective components and the respective devices to control the operation of the multifunction peripheral 2.

The operation panel 4 of the multifunction peripheral 2 includes, for example, a display control portion 40 and a memory 46 for storing image data on a screen and an image to be displayed. The display control portion 40 is constituted by a CPU, an IC, and the like. The display control portion 40 controls displaying of the liquid crystal display portion 41 based on the image data on the screen to be displayed. Further, the display control portion 40 receives an output from the touch panel portion 42, and identifies the coordinates (position) at which the liquid crystal display portion 41 is pressed. For example, the memory 46 stores data such as a table indicating a correspondence between the output from the touch panel portion 42 and the coordinates.

The display control portion 40 compares the pressed position (coordinates) to the image data on each kind of screen displayed on the liquid crystal display portion 41, and identifies and recognizes a pressed key. In this manner, the user can make settings to use respective functions such as copying by pressing the keys (software keys) displayed on the liquid crystal display portion 41. For example, the display control portion 40 recognizes setting contents and transmits the setting contents to the control portion 9. With this operation, the control portion 9 causes the respective components within the multifunction peripheral 2 to perform an operation that reflects the contents of the setting performed on the operation panel 4. Further, the various hardware keys (such as the numeric keypad portion 44 and the document box key 45) provided to the operation panel 4 are also connected to the display control portion 40, and the display control portion 40 recognizes that each of the various keys is pressed and informs the control portion 9 of the fact.

In addition, the control portion 9 is connected to a data communication portion 94 including various connectors, sockets, and chips for controlling communications. The data communication portion 94 communicatively connects the multifunction peripheral 2 to the PC 201 and the communication partner's FAX machine 202 through the network or a public line. For example, the data communication portion 94 can transmit data including the image data to the PC 201 in the external portion and the communication partner's FAX machine 202 (which may be an Internet FAX machine) (scan function and FAX function). Further, it is possible to perform printing based on the image data obtained from the PC 201 or the communication partner's FAX machine 202 (printer function and FAX function). Note that, the PC 201 can be used as the computer 1 described in the first embodiment. As described above, the multifunction peripheral 2 has a plurality of functions among the copy function, the printer function, the scan function, and the FAX function.

(Document Box Function)

Figure 8:
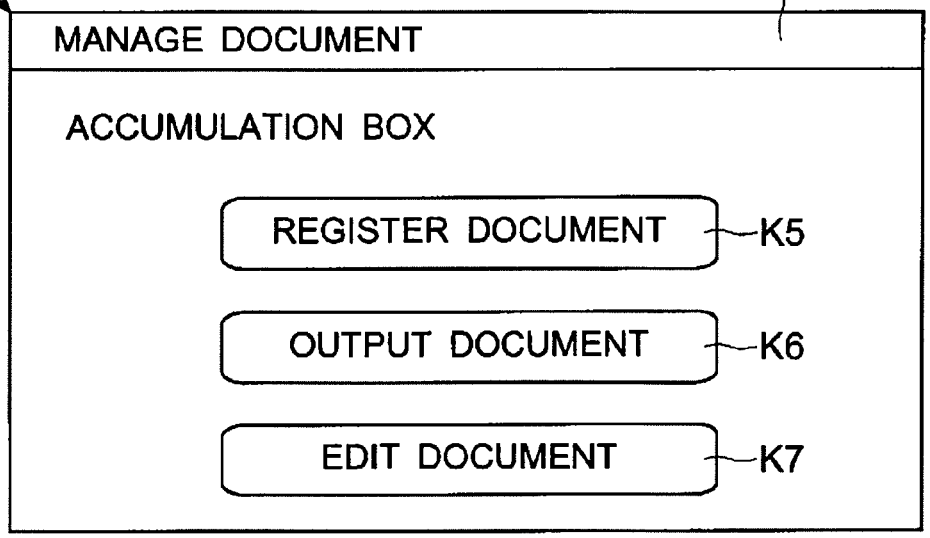
FIG. 8 is an explanatory diagram illustrating an example of a function selection screen displayed on the multifunction peripheral.
Figure 9:
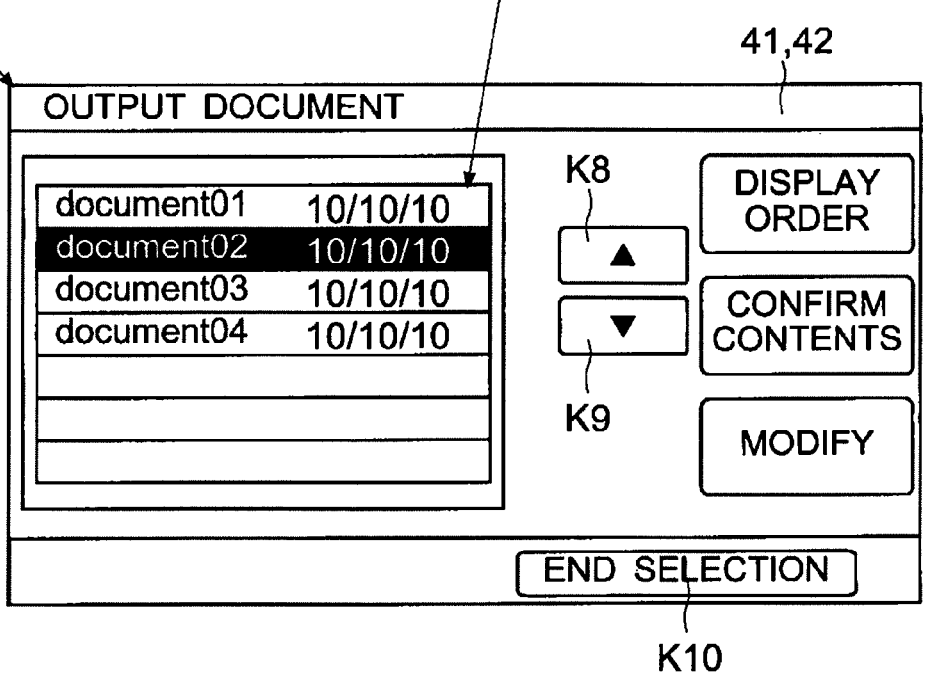
FIG. 9 is an explanatory diagram illustrating an example of a document output setting screen displayed on the multifunction peripheral.
Figure 10:
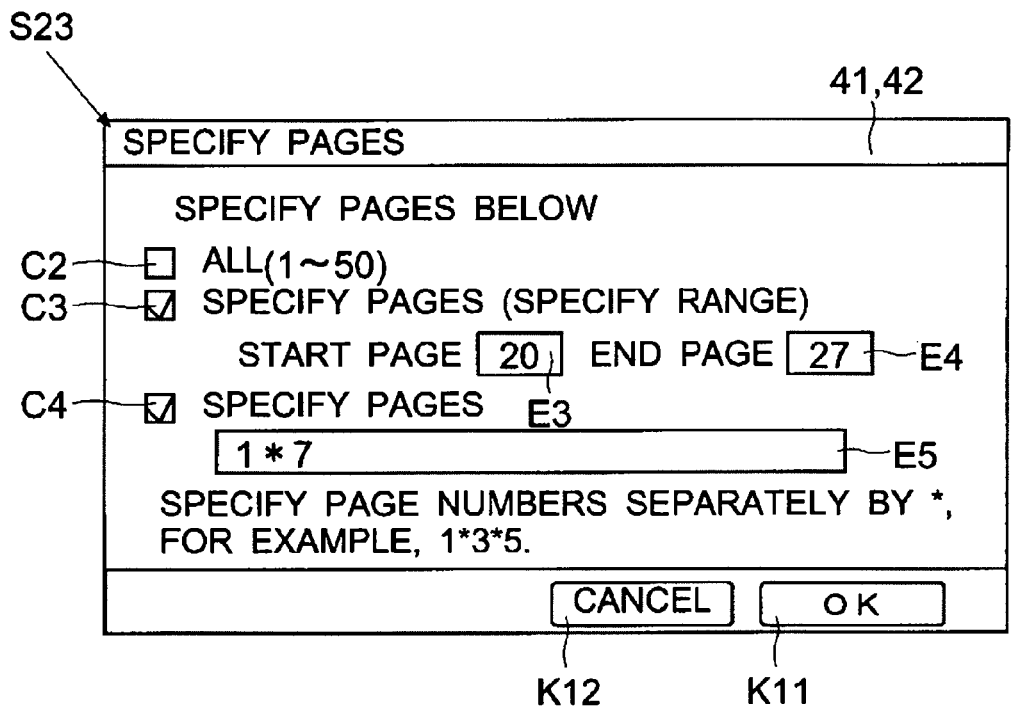
FIG. 10 is an explanatory diagram illustrating an example of a range specification screen displayed on the multifunction peripheral.
Figure 11:
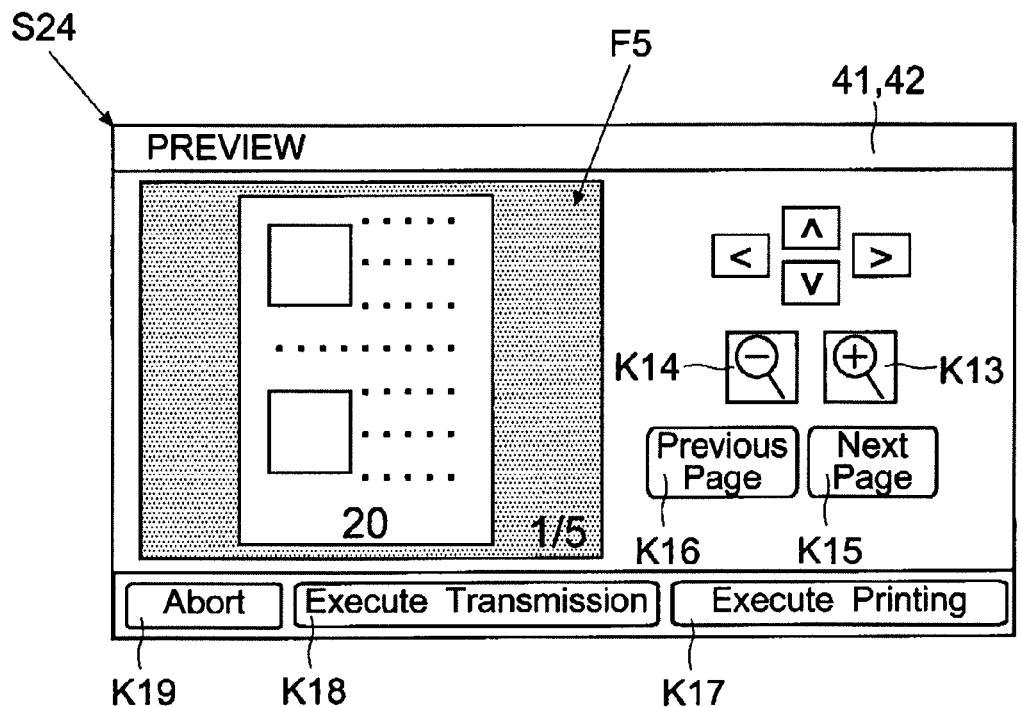
FIG. 11 is an explanatory diagram illustrating an example of a preview image confirmation screen displayed on the multifunction peripheral.

Next, reference is made to FIGS. 8 to 11 to describe a document box function performed on the multifunction peripheral 2 according to the second embodiment. FIG. 8 is an explanatory diagram illustrating an example of a function selection screen S21 displayed on the multifunction peripheral 2. FIG. 9 is an explanatory diagram illustrating an example of a document output setting screen S22 displayed on the multifunction peripheral 2. FIG. 10 is an explanatory diagram illustrating an example of a page specification screen S23 displayed on the multifunction peripheral 2. FIG. 11 is an explanatory diagram illustrating an example of a preview image confirmation screen S24 displayed on the multifunction peripheral 2.

On the multifunction peripheral 2 of this embodiment, the storage portion 93 stores (accumulates) the image data on one or a plurality of document sheets read by using the image reading portion 3 as one file (document). Note that, a format of the saved file (hereinafter, referred to as "accumulated document") is selected at the time of registration (for example, PDF, JPEG, or TIFF). The accumulated document (image data) stored in the storage portion 93 is reused (printed or transmitted) at a later date (which can be shared by a plurality of users).

The document box function is a function regarding the input of the accumulated document to the storage portion 93 and the output and reuse of the accumulated document. The document box function allows the accumulated document to be saved, printed, transmitted, deleted, combined, and the like. Therefore, an example of a procedure for using the document box function is described below First, reference is made to FIG. 8 to describe the function selection screen S21 for selecting which function regarding the accumulated document is to be used. When the document box key 45 is pressed, the display control portion 40 causes the liquid crystal display portion 41 to display the function selection screen S21 illustrated in FIG. 8.

Arranged on the function selection screen S21 are a plurality of keys such as a document registration key K5, a document output key K6, and a document edit key K7. The document registration key K5 is pressed to read a document by using the image reading portion 3 and registers (stores) the obtained image data with a name assigned thereto in the storage portion 93 as a document (input of the accumulated document). The document output key K6 is pressed to perform printing or transmission by using the accumulated document stored in the storage portion 93. The document edit key K7 is pressed to delete the accumulated document stored in the storage portion 93 or combine a plurality of accumulated documents into one (as one file).

Next described is a case of outputting the accumulated document. When the document output key K6 is pressed, the display control portion 40 causes the liquid crystal display portion 41 to display the document output setting screen S22 illustrated in FIG. 9. The document output setting screen S22 is provided with a list display area F4 for displaying the accumulated documents within the storage portion 93 in a list format. FIG. 9 illustrates an example in which four kinds of accumulated documents are stored in the storage portion 93. The name and a registration date of each accumulated document are displayed in the list display area F4. The user presses and specifies the accumulated document to be output. The display control portion 40 causes the liquid crystal display portion 41 to display the accumulated document pressed by the user in reverse video to thereby indicate which one is specified.

Note that, when there are a large number of accumulated documents, the list display area F4 may fail to display all the accumulated documents, and hence an up key K8 and a down key K9 are provided. In a case where as many accumulated documents as cannot be displayed in the list display area F4 are stored in the storage portion 93, when the up key K8 or the down key K9 is pressed, the display control portion 40 changes the accumulated documents to be displayed so as to scroll the display of the list display area F4.

When the selection of the accumulated document is completed, the user presses a selection end key K10. When the selection end key K10 is pressed, the display control portion 40 causes the liquid crystal display portion 41 to display the page specification screen S23 illustrated in FIG. 10. The page specification screen S23 is a screen for specifying the pages to be printed or transmitted which are included in the accumulated document. The page specification screen S23 is similar to the page specification area F2 of the setting screen S10 for the data for executing a job according to the first embodiment.

The page specification screen S23 is provided with three checkboxes C for specifying the pages to be printed or transmitted. A checkbox C2 labeled "All" is pressed to perform the printing or transmission of all the pages included in the accumulated document.

A checkbox C3 labeled "Specify pages (range specification)" is pressed to specify the range of the pages to be printed or transmitted within the accumulated document. The user can specify the first page of the pages to be printed or transmitted by pressing a start page input field E3 and using the numeric keypad portion 44 to input a numeral. Further, the user can specify the last page of the pages to be printed or transmitted by pressing an end page input field E4 and using the numeric keypad portion 44 to input a numeral. In the case of printing or transmitting the continuous range (continuous pages) of, for example, pages 20 to 27 of the accumulated document containing fifty pages in total, as illustrated in FIG. 10, the user inputs "20" into the start page input field E3 and inputs "27" into the end page input field E4.

A checkbox C4 labeled "Specify pages" is pressed to specify the pages to be printed or transmitted by using the numeric keypad portion 44. The user can specify the pages that are separate from each other without forming a sequence of pages (non-continuous pages) by pressing a page specification input field E5 and using the numeric keypad portion 44 to input a numeral. For example, to perform the printing or transmission by specifying specific pages such as page 1 and page 7 that do not form a sequence of pages (non-continuous pages) among all the fifty pages of the accumulated document, the user inputs "1*7" into the page specification input field E5 (the key "*" is one of the keys included in the numeric keypad portion 44). Note that, when both the checkbox C3 and the checkbox C4 are checked, it is possible to specify the pages of both kinds of the continuous pages and the non-continuous pages.

When the range specification (page specification) is completed, the user presses an OK key K11. When the OK key K11 is pressed, the display control portion 40 causes the liquid crystal display portion 41 to display the preview image confirmation screen S24 illustrated in FIG. 11. Note that, a cancel key K12 is pressed to stop the outputting of the accumulated document. The preview image confirmation screen S24 is a screen for confirming the contents of the pages to be printed or transmitted among the specified pages.

The preview image confirmation screen S24 is provided with a preview image display area F5 for displaying the preview images page by page. With regard to the preview images displayed on the preview image confirmation screen S24, in the same manner as in the first embodiment (see FIGS. 3A to 3C), when the specified pages are the continuous pages, the display control portion 40 causes the liquid crystal display portion 41 to display the preview images of the first page and the last page within the specified range. Note that, when the printing or transmission of all the pages of the accumulated document is specified with the checkbox C2 pressed, the display control portion 40 causes the liquid crystal display portion 41 to display the preview images of the first page and the last page.

With regard to the non-continuous page, in the same manner as in the first embodiment (see FIGS. 3A to 3C), the display control portion 40 causes the liquid crystal display portion 41 to display the preview images of all the specified non-continuous pages. Note that, based on the page specification, the display control portion 40 causes the liquid crystal display portion 41 to display the total number of pages of the preview images to be displayed (in the example of FIG. 11, 5 pages in total) and the position of the page that is currently displayed (in the example of FIG. 11, first page) in the bottom right of the preview image display area F5.

Further, the preview image confirmation screen S24 is provided with an enlargement key K13 that is pressed to enlarge the preview image and display the resultant and a reduction key K14 that is pressed to reduce the preview image and display the resultant. When the enlargement key K13 or the reduction key K14 is pressed, the display control portion 40 causes the liquid crystal display portion 41 to enlarge or reduce the preview image to be displayed in the preview image display area F5 and display the resultant.

Note that, the image data for causing the liquid crystal display portion 41 to display the preview image is supplied from the control portion 9 of the multifunction peripheral 2 to the operation panel 4 (display control portion 40). The display control portion 40 transmits the content input (the page specified) on the page specification screen S23 to the control portion 9. Then, based on the specified pages, the control portion 9 modifies the image data on the accumulated document, generates the image data for the preview image to be displayed, and transmits the image data to the display control portion 40. Then, the display control portion 40 causes the liquid crystal display portion 41 to display the preview image based on the supplied image data.

In the case of enlargement or reduction of the preview image, each time the enlargement key K13 or the reduction key K14 is pressed, the control portion 9 may generate the image data for the preview image and supply the image data to the display control portion 40 to cause the enlarged or reduced preview image to be displayed. Alternatively, the display control portion 40 may perform the enlargement or reduction processing on the image data received from the control portion 9 to cause the enlarged or reduced preview image to be displayed.

Further, the preview image confirmation screen S24 is provided with a next page key K15 and a previous page key K16. The next page key K15 is pressed to cause the preview image in the next position to be displayed. The previous page key K16 is pressed to cause the preview image in the previous position to be displayed. When the next page key K15 or the previous page key K16 is pressed, the display control portion 40 switches the preview images displayed in the preview image display area F5.

Further, for example, a printing execution key K17, a transmission execution key K18, and an abort key K19 are provided in the bottom of the preview image confirmation screen S24. The printing execution key K17 is pressed to perform the printing as it is when there is no error in specifying the page. When the printing execution key K17 is pressed, the display control portion 40 informs the control portion 9 of the main body that an input instructing to print the specified pages has been made. In response thereto, the control portion 9 causes the image forming portion 7 or the like to operate and print the specified pages.

The transmission execution key K18 is pressed to perform the transmission as it is when there is no error in specifying the page. When the transmission execution key K18 is pressed, the display control portion 40 recognizes that an input instructing to transmit the specified pages has been made, and causes the liquid crystal display portion 41 to display, for example, a screen (not shown) for inputting the address information. When the address information is input, the display control portion 40 informs the control portion 9 of the main body of the instruction to transmit the specified pages along with the input address information. In response thereto, the control portion 9 causes the data communication portion 94 or the like to operate and transmit the specified pages.

Note that, after all the preview images to be displayed have been displayed, the display control portion 40 receives an input (pressing) with respect to the printing execution key K17 and the transmission execution key K18. Therefore, the display control portion 40 may cause the liquid crystal display portion 41 to display the printing execution key K17 and the transmission execution key K18 after all the preview images to be displayed have been displayed.

(Preview Image Display Control)

Figure 12:
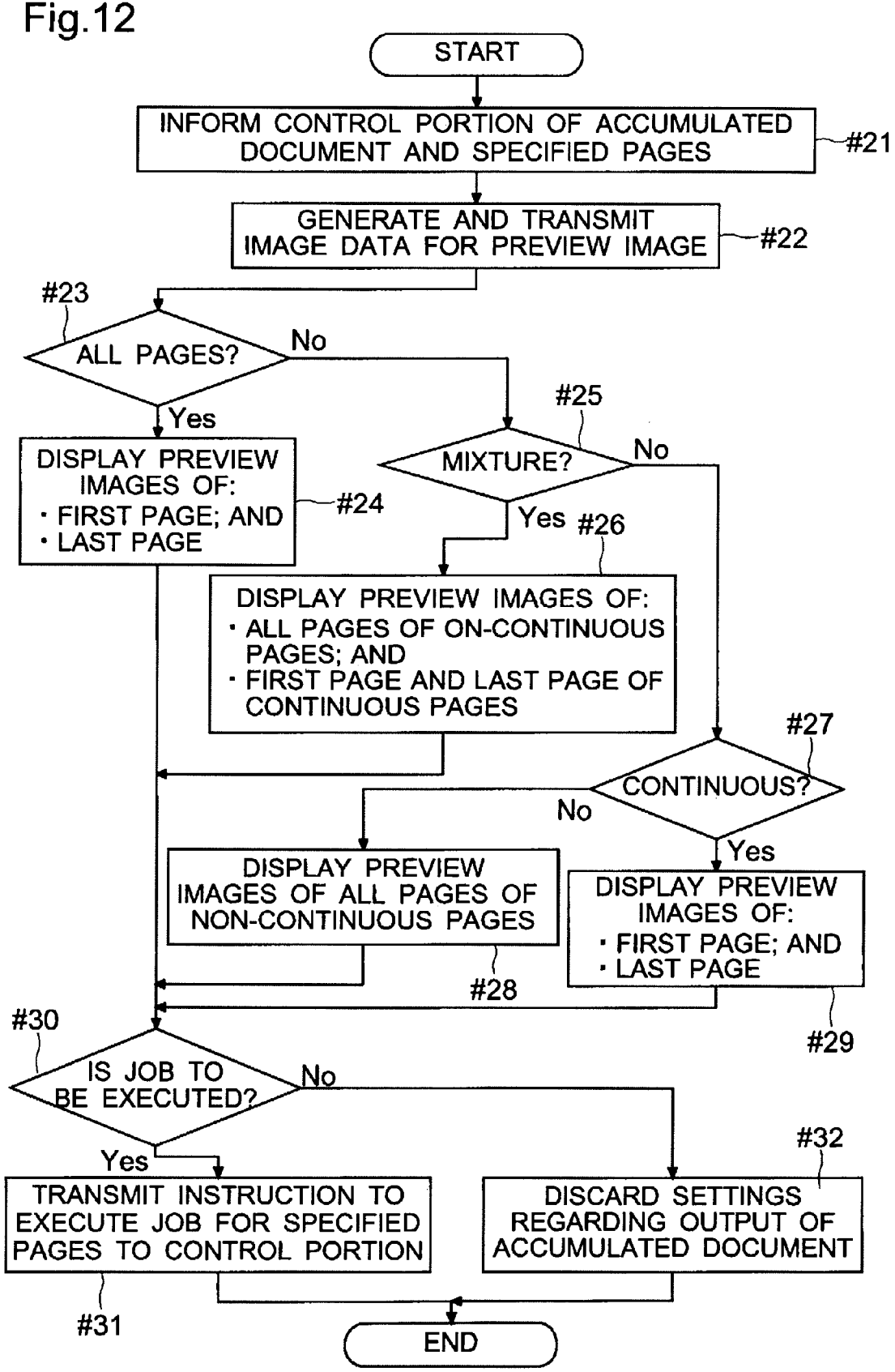
FIG. 12 is a flowchart illustrating an example of display control of the preview image performed on the multifunction peripheral.

Next, reference is made to FIG. 12 to describe an example of display control of the preview image performed on the multifunction peripheral 2 according to the second embodiment. FIG. 12 is a flowchart illustrating an example of the display control of the preview image performed on the multifunction peripheral 2.

First, the start illustrated in FIG. 12 represents a time point to start causing the liquid crystal display portion 41 to display the preview image confirmation screen S24 after such course that the document output key K6 was pressed on the liquid crystal display portion 41→the accumulated document was selected on the document output setting screen S22→the pages to be printed or transmitted were specified on the page specification screen S23 (see FIG. 10) and the OK key K11 was pressed.

Subsequently, the display control portion 40 informs the control portion 9 of the main body of the selected accumulated document and the respective pages that have been specified so as to be printed or transmitted (Step #21). Alternatively, the display control portion 40 may determine the pages for which the preview images are to be displayed and transmit the data indicating the pages to be displayed. Then, the control portion 9 of the main body generates the image data on the pages to be displayed as the preview images within the selected accumulated document, and transmits the image data to the display control portion 40 (Step #22).

Subsequently, if the pages that have been specified so as to be printed or transmitted are set to all the pages (all the pages with the checkbox C2 selected) (Yes in Step #23), the display control portion 40 causes the liquid crystal display portion 41 to display the preview images of the first page and the last page within the selected accumulated document (Step #24).

On the other hand, if all the pages are not specified (No in Step #23), and if a mixture of the non-continuous pages and the continuous pages is specified (with both checkbox C3 and checkbox C4 selected; Yes in Step #25), the display control portion 40 causes the liquid crystal display portion 41 to display the preview images of all the non-continuous pages and the first and last pages of the continuous pages (Step #26).

On the other hand, if there is no mixture (No in Step #25), and if the specified pages are the non-continuous pages (No in Step #27), the display control portion 40 causes the liquid crystal display portion 41 to display the preview images of all the non-continuous pages (Step #28). Further, if the specified pages are the continuous pages (with only the checkbox C3 selected; Yes in Step #27), the display control portion 40 causes the liquid crystal display portion 41 to display the preview images of the first and last pages of the continuous pages (Step #29).

Then, after all the preview images to be displayed have been displayed (after Step #24, Step #26, Step #28, and Step #29), the display control portion 40 confirms whether or not to execute the job (printing or transmission) (Step #30). Specifically, it is confirmed whether or not the printing execution key K17 or the transmission execution key K18 has been pressed.

If the job is to be executed for the specified pages as it is, the display control portion 40 transmits the instruction to execute the job for the specified pages to the control portion 9 (Step #31). With this operation, the control portion 9 causes the image forming portion 7 or the data communication portion 94 to operate and cause the job to be executed (end).

On the other hand, when there is an error in specifying the page, when the abort key K19 is pressed, the display control portion 40 discards the settings regarding the output of the accumulated document (Step #32). Then, the control is ended as it is (end). For example, the display control portion 40 causes the liquid crystal display portion 41 to display the function selection screen S21.

As described above, the image forming apparatus (for example, multifunction peripheral 2) according to this embodiment includes: the storage portion 93 for storing an accumulated document including image data on one or a plurality of pages; the image forming portion 7 for performing printing based on the accumulated document; the input portion (such as the touch panel portion 42) for receiving a specification input for specifying a page for which a job is to be executed among pages included in the accumulated document (specification input made on the page specification screen S23), an instruction input for causing the preview image of a specified page being the page specified by the specification input to be displayed after the specification input for specifying a page is made (for example, input by pressing the OK key K11 on the page specification screen S23), and an input for switching display pages for the preview image (for example, input by pressing the next page key K15 on the preview image confirmation screen S24); and the display portion (liquid crystal display portion 41) for displaying the preview images of only the first and last pages among continuous pages that form a continuous range when the specified pages are the continuous pages and displaying the preview images of all non-continuous pages that are separate from each other without forming a continuous range when the specified pages are the non-continuous pages.

With this configuration, it is possible to confirm the preview images with minimum labor. Accordingly, it is possible to reduce the time required to confirm the preview images compared to the conventional technology. Further, when the specified pages are the non-continuous pages after the pages are specified, the preview images of all the pages of the non-continuous pages are displayed. With this operation, it is possible to reliably confirm whether or not the pages have been specified without an error. Therefore, it is possible to prevent the occurrence of waste of paper and the like due to a setting error (page specification error). Further, the user can concentrate on confirming the specified pages. Accordingly, it is possible to discover an error in specifying the page with accuracy.

Further, the input portion (such as the touch panel portion 42) receives an input for specifying the pages of both kinds of the continuous pages and the non-continuous pages, and the display portion (liquid crystal display portion 41) displays, for the continuous pages, the preview images of only the first and last pages among the continuous pages, and for the non-continuous pages, displays the preview images of all the non-continuous pages. With this configuration, the user can specify the pages in a plurality of manners, and the preview images are displayed in accordance with the specified manner. Accordingly, the user can confirm the preview images with minimum labor and with accuracy according to the part of the specified pages, which allows the efficient confirmation of the preview images.

Further, the input portion (such as the touch panel portion 42) receives an input for specifying all the pages included in the accumulated document. The display portion (liquid crystal display portion 41) displays the preview images of the first page and the last page within the accumulated document. With this configuration, even when all the pages included in the accumulated document are specified, it serves the purpose to confirm the preview images corresponding to the two pages without confirming the preview images of all the pages. Accordingly, the user can confirm the preview images with minimum labor and with accuracy, which allows the efficient confirmation of the preview images.

Further, after the display portion (liquid crystal display portion 41) has displayed the preview images of all the pages to be displayed, the image forming portion 7 performs the printing of the specified pages within the accumulated document. Further, the image forming apparatus (for example, multifunction peripheral 2) according to this embodiment includes the data communication portion 94 for transmitting/receiving data, and the data communication portion 94 transmits the data on the specified pages within the accumulated document after the display portion (liquid crystal display portion 41) has displayed the preview images of all the pages to be displayed. With this configuration, the execution of the job is started after the user positively confirms whether or not there is no error in specifying the page, which allows the printing or transmission to be performed reliably and causes no waste due to an error in specifying the page.

Next, another embodiment is described. The first embodiment is described by taking the information processing device as an example, and the second embodiment is described by taking the image forming apparatus as an example. However, as illustrated in the flowcharts of FIGS. 5 and 12, the present invention can be interpreted as a method of displaying a preview image on the information processing device or the image forming apparatus. That is, the method of displaying the preview image according to the present invention includes: receiving a specification input for specifying a page for which the image forming apparatus 101 (for example, multifunction peripheral 2) is caused to execute a job among pages included in data; receiving an instruction input for causing the preview image of a specified page being the page specified by the specification input to be displayed after the specification input for specifying the page is made; receiving an input for switching display pages for the preview image; causing the display 14 for displaying the preview image for confirmation of the specified page to display the preview images of only the first and last pages among continuous pages that form a continuous range when the specified pages are the continuous pages; and causing the display 14 to display the preview images of all non-continuous pages that are separate from each other without forming a continuous range when the specified pages are the non-continuous pages.

Further, the method includes: receiving an input for specifying the pages of both kinds of the continuous pages and the non-continuous pages; causing the display 14 to display, for the continuous pages, the preview images of only the first and last pages among the continuous pages; and causing the display 14 to display, for the non-continuous pages, the preview images of all the non-continuous pages.

Further, the method includes: receiving an input for specifying all the pages included in the data; and causing the display 14 to display the preview images of the first page and the last page within the data. The above-mentioned method of displaying the preview image can produce the same effects as those of the information processing device according to the first embodiment.

The embodiments of the present invention have been described, but the scope of the present invention is not limited thereto. The present invention may be implemented by making various modifications thereto without departing from the gist of the present invention.

What is claimed is:

1. An information processing device, comprising:
an input device for receiving a specification input for specifying a page or a range of pages to be a specified page or specified pages for which an image forming apparatus is caused to execute a job among a plurality of pages included in one file, an instruction input for causing a preview image of the specified page or pages to be displayed after the specification input is received, and an input for switching display pages for the preview image;
a display for displaying the preview images of only a first page and a last page of pages that form a continuous range of pages, without displaying any page other than the first and last pages, when the specified pages are continuous pages and displaying the preview images of all non-continuous pages that are separate from each other and do not form a continuous range of pages when the specified pages are non-continuous pages;
a communication portion for transmitting data for executing a job to be executed by the image forming apparatus based on the specified page or pages; and
a processing portion, wherein
the input device receives an input for specifying the pages of both continuous pages and non-continuous pages,
when the specified pages are continuous pages, the processing portion generates image data of preview images of only first and last pages of the continuous pages, and the display displays the preview images of only the first and last pages of the continuous pages, without displaying any page other than the first and last pages, and
when the specified pages are non-continuous pages, the processing portion generates image data of preview images of all the non-continuous pages, and the display displays the preview images of all the non-continuous pages.

2. An information processing device according to claim 1, wherein:
the input device receives an input for specifying all the pages included in the file; and
the display displays the preview images of the first page and the last page within the file.

3. An information processing device according to claim 1, wherein the communication portion transmits the data for executing a job after the display has displayed the preview images of all the pages to be displayed.

4. An image forming apparatus, comprising:
a storage portion for storing one accumulated document including image data on one or a plurality of pages;
an image forming portion for performing printing based on the accumulated document;
an input portion for receiving a specification input for specifying a page or a range of pages for which a job is to be executed among the one or the plurality of pages included in the accumulated document, an instruction input for causing a preview image of the specified page or pages to be displayed after the specification input is received, and an input for switching display pages for the preview image;
a display portion for displaying the preview images of only a first page and a last page of pages that form a continuous range of pages, without displaying any page other than the first and last pages, when the specified pages are continuous pages and displaying the preview images of all non-continuous pages that are separate from each other and do not form a continuous range of pages; and
a control portion, wherein
the input device receives an input for specifying the pages of both continuous pages and non-continuous pages,
when the specified pages are continuous pages, the control portion generates image data of preview images of only first and last pages of the continuous pages, and the display displays the preview images of only the first and last pages of the continuous pages, without displaying any page other than the first and last pages, and
when the specified pages are non-continuous pages, the control portion generates image data of preview images of all the non-continuous pages, and the display displays the preview images of all the non-continuous pages.

5. An image forming apparatus according to claim 4, wherein:
the input portion receives an input for specifying all the pages included in the accumulated document; and
the display portion displays the preview images of the first page and the last page within the accumulated document.

6. An image forming apparatus according to claim 4, wherein the image forming portion performs the printing on the specified page within the accumulated document after the display portion has displayed the preview images of all the pages to be displayed.

7. An image forming apparatus according to claim 4, further comprising a data communication portion for transmitting and receiving data,
wherein the data communication portion transmits data of the specified page within the accumulated document after the display portion has displayed the preview images of all the pages to be displayed.

8. A method of displaying a preview image, comprising:
receiving a specification input for specifying a page or a range of pages for which an image forming apparatus is caused to execute a job among a plurality of pages included in one file;
receiving an instruction input for causing the preview image of a specified page or pages to be displayed after the specification input for specifying the page is received;
receiving an input for switching display pages for the preview image;
causing a display for displaying the preview image for confirmation of the specified page or pages to display the preview images of only a first page and a last page of pages that form a continuous range of pages, without displaying any page other than the first and last pages, when the specified pages are continuous pages; and
causing the display to display the preview images of all non-continuous pages that are separate from each other and do not form a continuous range of pages when the specified pages are non-continuous pages, wherein the method further comprises:
receiving an input for specifying the pages of both continuous pages and non-continuous pages;
causing the display to display the preview images of only the first page and the last page of continuous pages, without displaying any page other than the first and last pages; and
causing the display to display the preview images of all non-continuous pages.

9. A method of displaying a preview image according to claim 8, further comprising:
receiving an input for specifying all the pages included in the file; and
causing the display to display the preview images of the first page and the last page within the file.

* * * * *